MULTIPLEX FREQUENCY MODULATION SYSTEM

Filed Feb. 6, 1950 3 Sheets-Sheet 1

INVENTOR
GREGORY J. HARMON
BY Hyman Hurwitz
ATTORNEY

MULTIPLEX FREQUENCY MODULATION SYSTEM

Filed Feb. 6, 1950 3 Sheets-Sheet 2

INVENTOR
GREGORY J. HARMON

BY Lyman Hurwitz
ATTORNEY

INVENTOR
GREGORY J. HARMON

BY Hyman Hurvitz
ATTORNEY

Patented Sept. 2, 1952 2,609,535

UNITED STATES PATENT OFFICE 2,609,535

MULTIPLEX FREQUENCY MODULATION SYSTEM

Gregory J. Harmon, Washington, D. C., assignor, by mesne assignments, to Padevco, Inc., Washington, D. C., a corporation of Delaware Application February 6, 1950, Serial No. 142,643

7 Claims. (Cl. 343—200)

The present invention relates generally to systems of communication by means of frequency modulated waves, and more particularly to systems of communication by means of frequency modulated waves which occupy a common channel, but which may be separately detected without mutual interference.

Briefly described, a first frequency modulated wave is transmitted, which occupies a predetermined channel, or which has predetermined maximum deviations with respect to a mean frequency value. A second frequency modulated wave is commonly transmitted, within the channel occupied by the first wave. The second wave occupies a mean carrier value which is offset from the frequency of the first wave by a predetermined amount. The modulation of the second wave consists of the same modulation which is applied to the first wave, plus a second modulation. The first modulation is arranged to deviate the frequency of the second wave in the same sense, and to the same extent, as the first wave is deviated by the first modulation. Additionally, the second modulating signal further deviates the frequency of the second wave. The net result is as though the second wave were modulated in response to the second modulation signal about a mean frequency fixed with respect to the instantaneous frequency of the first wave during modulations thereof by the first modulating signal. The frequency difference between the two waves in the absence of any modulating signal is established to have a value equal to or greater than the maximum deviation which may be caused by the second modulating signal. Additionally, the second wave, when it approaches the limits of the frequency band established for the first wave, is very rapidly shifted away from the limit of the band by a frequency corresponding with twice the offset value of the second wave with respect to the first. Accordingly, the second wave varies in frequency with respect to the first wave as a mean value and may be greater than the first wave in frequency until the high frequency limit of the assigned frequency channel is reached by the second wave. At this point it becomes less in frequency than the first wave and remains so until the opposite edge of the channel is attained by the second wave, at which point a further shift of frequency occurs, equal in extent to twice the offset value between the unmodulated carriers, and in such sense as to again render the second wave higher in frequency than the first wave.

The first wave may be transmitted at relatively high amplitude, while the second wave is transmitted at relatively low amplitude. From this results that the first wave may be detected by means of a conventional receiver, without interference from the second wave. The second modulating signal is proportional in amplitude at each instant to the frequency difference between the two waves, and, accordingly, may be detected by means of a beat frequency detector which is responsive to the first and second waves simultaneously.

It is accordingly a broad object of the present invention to provide a system of communicating by means of frequency modulated waves occupying a common channel, and which may be separately detected without mutual interference.

It is a further object of the present invention for communicating by means of two frequency modulated waves of different amplitudes, which occupy a common channel.

It is still another object of the invention to provide a novel system of communication by means of frequency modulated waves, wherein one of the waves is frequency modulated in response to a first signal, and wherein the mean or unmodulated value of the second wave is established continuously at a fixed frequency difference from the frequency of the first wave during the modulation, and wherein, nevertheless, both frequency modulated waves may occupy a single channel which is just adequate for the first wave alone, the waves being, nevertheless, susceptible of separate detection without mutual interference.

The above and still further features, objects, advantages of the present invention will become apparent upon consideration of the following detailed description of a specific embodiment of the invention, especially when taken in conjunction with the accompanying drawings, wherein.

Figure 1:
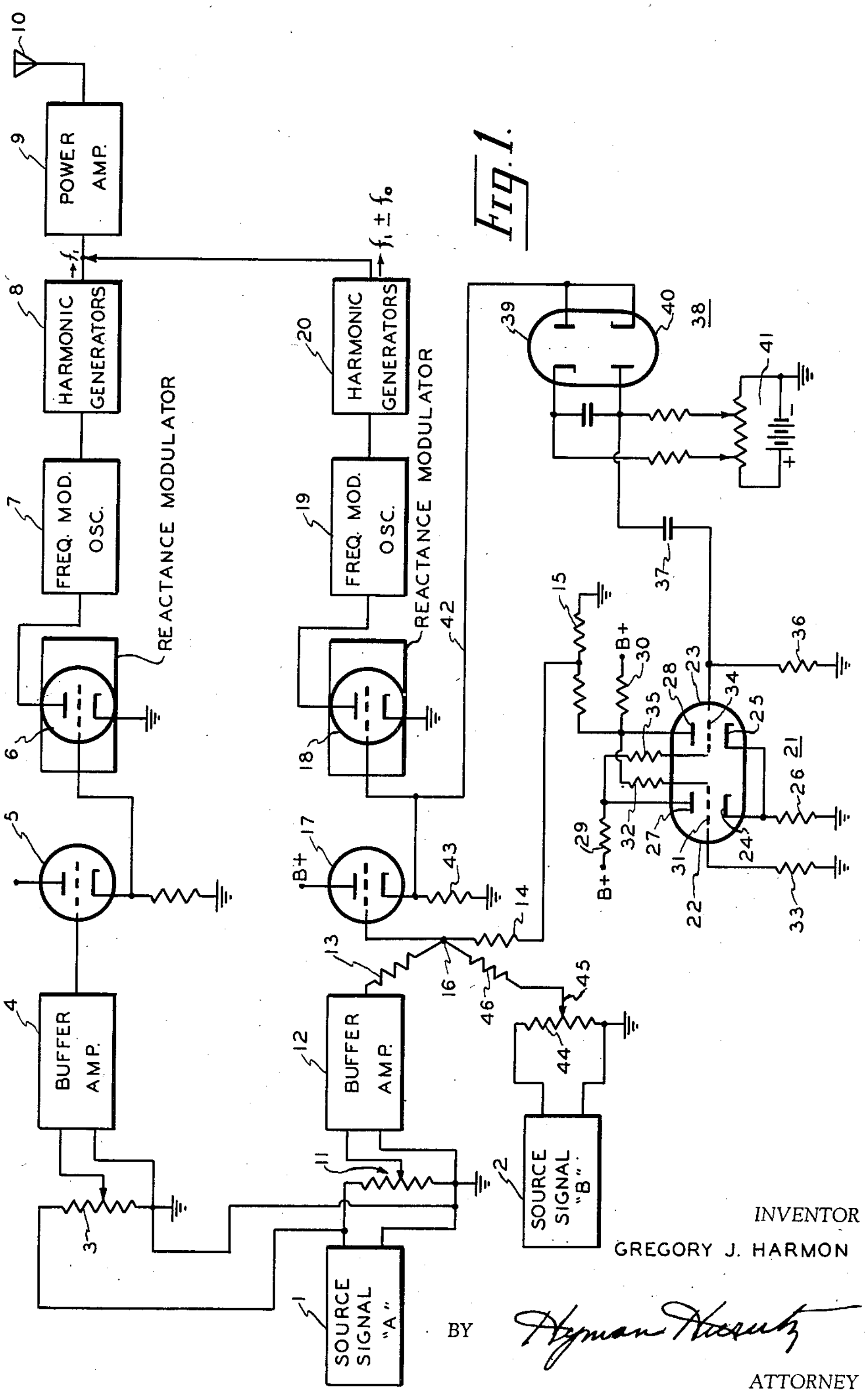
Figure 1 is a diagram, partly schematic and partly in functional block, of a transmitter arranged in accordance with the invention.

The present invention is related in concept and mode of operation to an application for U. S. Patent, S. N. 140,244, filed January 24, 1950, in the name of Raymond M. Wilmotte, entitled "F. M. Systems VI," and the present invention differs principally from certain inventions disclosed in that application by virtue of the provision of devices for maintaining the two frequency modulated waves constantly within a frequency channel allocated to one of the waves alone.

Referring now more specifically to the drawings, reference numeral 1 indicates a first source of modulating signal A, while the reference numeral 2 indicates a source of second modulating signal B. The output of the source 1 of signal A is applied via an adjustable attenuator 3 to a buffer amplifier 4, the output of which is applied to a conventional cathode follower 5, and the output of the latter is applied to a reactance tube modulator 6 which modulates the frequency of a frequency modulation oscillator 7, in accordance with the signal A. The output of the frequency modulator oscillator 7 is multiplied in frequency in conventional fashion by means of harmonic generators 8, and the output of the latter is amplified in power by means of power amplifiers 9 and radiated from an antenna 10. The carrier frequency provided at the output of the harmonic generators 8 may be a frequency $f_1$ (Figure 3) and the design of the system may be such that the maximum deviations of the frequency $f_1$ which may occur in response to the signal A are $f_2$ in an increasing direction and $f_3$ in a decreasing or negative direction. (See Figure 3.) Accordingly, the channel occupied by the frequency $f_1$ extends from $f_3$ to $f_2$.

Additionally, the output of signal source 1, corresponding with signal A, may be applied via a further attenuator 11 to a further buffer amplifier 12, and the output of the latter may be applied to resistances 13, 14 and 15 in series, the latter resistance being grounded at one end. The voltage existing between the junction point 16 of resistors 13 and 14 and ground, or otherwise stated the voltage existing across resistances 14 and 15, in response to signal A, is applied to the input of a cathode follower 17, and the output of the latter is applied to a reactance modulator 18, which modulates the frequency of frequency modulated oscillator 19. The output of the latter is multiplied in frequency by means of harmonic generators 20 and the output of the harmonic generators 20 is amplified by power amplifier 9 and radiated from antenna 10.

The normal bias on the cathode follower 17, in the absence of modulating signal, is established by the voltage existing across resistance 15, and the latter in turn is established by the operative condition of the multi-vibrator 21. The latter comprises two triode sections 22 and 23, the cathodes 24, 25 of which are connected via a common resistance 26 to ground. The anodes 27, 28 of the triode sections 22 and 23, respectively, are connected through separate load resistors 29 and 30 to separate sources of B+ supply. The control electrode 31 of triode section 22 is connected via a resistance 32 to anode 28 and via a further resistance 33 to ground. The control electrode 34 of triode section 23 is connected via resistance 35 to anode 27 and via resistance 36 to ground. The anode 28 is connected to supply voltage to the bias resistance 15 for the cathode follower 17. Accordingly, when the triode section 22 is non-conductive a relatively high voltage appears across the resistance 15, the latter emanating from the B+ supply for the triode section 22, and when the triode section 23 is conductive, current flow through the triode section 23 via the resistance 30 serves to reduce radically the total voltage across the bias resistance 15. Accordingly, the bias for the cathode follower 17 assumes one of two values, depending upon whether triode section 22 is or is not conductive.

It is well known that the conductive condition of the two triode sections or triodes of a multi-vibrator may be controlled by applying signals to either of the tube sections, since when one of the tube sections is conductive the other must always be non-conductive, and vice-versa. In the present case, control signal is applied to control electrode 34 via coupling condenser 37 and resistance 36, which acts as a grid leak for control electrode 34. Control signals are provided from a pulse selector, generally identified by the reference numeral 38 and comprising two back-to-back diodes 39 and 40, the latter of which passes negative pulses and the former of which passes positive pulses. The two diode sections 39 and 40 are separately and independently biased by a bias source 41 so that diode section 39 passes positive signals arriving over line 42 only if they exceed a value established by the bias source 41, while the diode section 40 is so biased, from the same bias source 41, that it passes current in response to signals arriving over line 42 only when these are less in amplitude than a predetermined bias established for the diode section. When diode section 39 has passed a positive signal, that signal is transferred to control electrode 34 via coupling condenser 37 and resistance 36, and renders tube section 23 conductive, thereby rendering triode section 22 non-conductive. The total voltage across bias resistance 15 then falls and the cathode follower 17 operates with a reduced positive normal bias. When this condition of operation has been established, it continues since diode section 39 is no longer then conductive. When the voltage on load resistor 43 falls below an assigned value, diode 40 conducts, and a negative pulse is applied to control electrode 34. Upon occurrence of the latter contingency the triode section 23 becomes non-conductive and the triode section 22 conductive. Thereby the total voltage across bias resistance 15 is raised, and accordingly the normal bias of the cathode follower 17 is raised, to a pre-selected value. This action renders diode section 40 non-conductive, but multi-vibrator 21 remains in its operated conduction until a further positive pulse is applied to control electrode 34, when the section 23 again conducts.

For the purposes of the present invention the total change in voltage across resistance 15, when the triode sections 22 and 23 change from one condition to another, must be such as to cause a total change in the mean frequency of frequency modulated oscillator 19 equal to twice the maximum deviation expected to occur in any direction in response to signal source B, this deviation being hereinafter denominated $f_0$. Accordingly, the change in bias established across resistance 15 by triode sections 22 and 23 must be equivalent to $2f_0$ in terms of frequency change. Additionally, the change in frequency must take place about a mean value corresponding with frequency $f_1$. Otherwise stated, when the bias across resistance 15 has one of its two preselected values and in the absence of any modulation, the output of frequency modulated oscillator 19 must be $f_1+f_0$, and in the opposite condition the output of frequency modulated oscillator 19 must be $f_1-f_0$.

The back-to-back diodes 39 and 40, which supply control pulses to the multi-vibrator 21 are supplied with signal over lead 42 from the cathode load 43 of cathode follower 17. The bias for triode section 39 must be so established that when the voltage across 43 reaches such a value that in response thereto the frequency of the frequency modulator 19 tends to go outside the assigned channel $f_2$ to $f_3$, the diode section 39 will pass current, reducing the bias on the cathode follower 17 and thereby the total voltage across resistance 43. The change in voltage, which, as has been explained, corresponds with the frequency shift $2f_0$, must be in such sense as to drive the signal provided at the output of the harmonic generators 20 into the assigned frequency channel. On the other hand, as the voltage across resistance 43 decreases to a value sufficient to drive the carrier outside the established frequency channel at the opposite end thereof, the bias established on the diode section 40 must permit passage of current through the diode, so that the multi-vibrator comprising triode sections 22 and 23 may reverse its operative condition, establish a new bias for the cathode follower 17, and the latter bias must be such that the voltage across resistance 43 will change in such sense and magnitude as to shift the frequency of the output of harmonic generators 20 interiorly of the assigned channel by an amount $2f_0$.

Accordingly, the function of the cathode follower 17, the back-to-back double diode 39, 40 and the multi-vibrator sections 22 and 23 is to assure that in response to modulating signal applied to the cathode follower 17, the output of the harmonic generators 20 can never fall outside the assigned channel, extending from frequency $f_2$ to $f_3$. If we assume that the carrier $f_1$ is being modulated in response to signal A and that similarly the carrier $f_1 \mp f_0$, provided by harmonic generators 20, is being similarly modulated, i. e., in the same sense and with the same total deviations, it will be evident that the two carriers will retain their spacing, in both amount and sense, so long as the carrier $f_1+$ or $-f_0$ does not reach either the frequency $f_2$ or the frequency $f_3$, i. e., approach closely to the limits of the assigned frequency channel. If we assume for example, that the frequency $f_0$ is positive, i. e., that $f_1+f_0$ is greater than $f_1$, this relationship will be maintained until such time as $f_1+f_0$ approaches closely the upper limit of the channel, i. e. $f_2$. At that time, the sign of $f_0$ will change, and the signals supplied by harmonic generators 20 will become $f_1-f_0$, so that the output of the harmonic generators 20 will then be continuously less in frequency than the carrier $f_1$ by the amount $f_0$. This condition will then subsist until the carrier $f_1-f_0$ reaches the lower frequency end of the channel, i. e. frequency $f_3$, at which point a reversal of the sign of $f_0$ will again occur in the opposite sense, so that now the frequency $f_1 \mp f_0$ will be greater than the frequency $f_1$ by the amount $f_0$.

We may now add to the modulating signal applied to the reactance modulator 18 via the cathode follower 17, a further component of signal deriving from source 2 of signal B. Signal B is applied to an attenuator 44, which is adjustable by means of a tap 45, and from which is derived signal B at an amplitude such that the maximum deviation of the carrier $f_1 \mp f_0$, in response to signal B, will be equal to $\pm f_0$. The voltage available at tap 45 is applied via a resistance 46 to junction point 16. Accordingly, the total current which flows in resistors 14 and 15 is the sum of the currents which are due to the outputs of attenuator 11 and attenuator 14, or equals the algebraic sum of signal A and signal B, as attenuated to accomplish the maximum desired frequency shifts. The action of the signal B is, then, to modify the instantaneous value of the frequency $f_0$, so that the latter approaches the frequency $f_1$ and recedes therefrom, in response to the signal B. Nevertheless, the total deviation of the frequency $f_0$ is arranged, as has been explained hereinbefore, to be such that in response to signal B it can never reach signal $f_1$ in frequency nor recede from signal $f_1$ by a frequency interval greater than $2f_0$. It results, therefore, that the frequency difference between carrier $f_1$, emanating from harmonic generators 8, and carrier $f_1 \mp f_0$, emanating from harmonic generators 20, the latter being understood to include variations of the frequency $f_0$ in response to the signal B, represents the signal B, and that the signal B may be derived in a receiver, by measuring continuously the beat frequency between the two carriers. At the same time the shifts in frequency of $f_0$, from positive to negative values, which are accomplished when the carrier $f_1+$ or $-f_0$ approaches either edge of the frequency channel having limits $f_2$ to $f_3$ in frequency, assure that the carrier $f_1+$ or $-f_0$ will never pass beyond the limits of the assigned channel.

During modulation the signal applied to the pulse selector 38 consists of the sum of the modulating signals A and B. This does not, however, modify in any respect the operation of the system, although in general it will modify the precise points at which the pulse selector operates to accomplish bias shift at the cathode follower 17.

Figure 3:
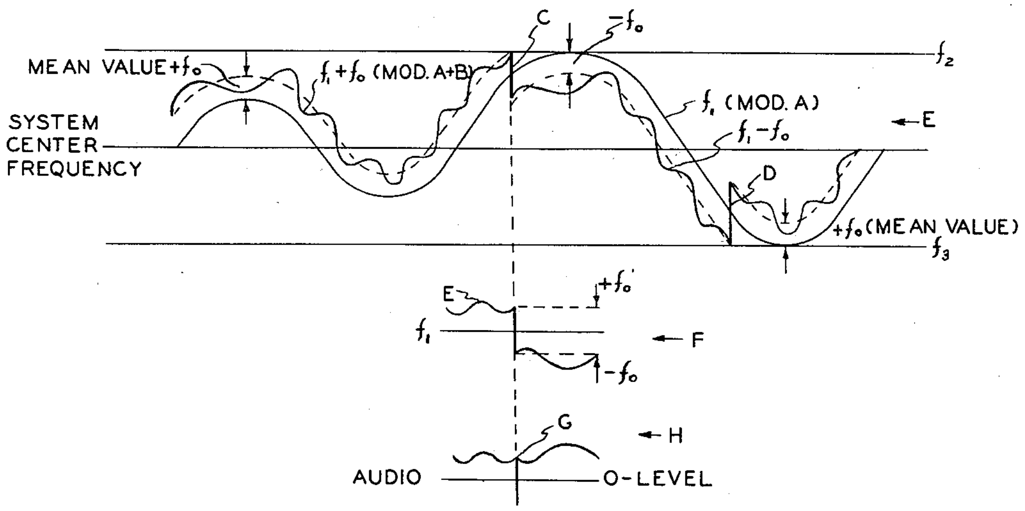
Figure 3 is a wave form diagram which is utilized in explaining the operation of a system illustrated in Figures 1 and 2; and, Figure 4 is a circuit diagram of a modification of the system of Figure 1.

It will be noted, however, that at the point where a sudden shift in frequency occurs, in response to a pulse provided by pulse selector 38, a sudden reversal of phase takes place in the modulation of the frequency $f_0$, as will be evident from a study of Figure 3 of the accompanying drawing at the transition points C and D. Plot E represents the frequency difference between the carrier $f_1$, and the carrier $f_0$, at transition point C, and accordingly, corresponds with the plot of points adjacent to the point C, on the assumption that the rate of change of frequency remains substantially constant during the transition. It will be observed that the frequency $f_0$, with its modulation, is increasing as it approaches the transition point, and continues to increase after it has passed the transition point. When the difference between the carrier $f_0$ and the carrier $f_1$ is plotted, as at F, on the other hand, it is seen that the frequency difference increases as the transition point is approached, and proceeds to decrease as the transition point is receded from. Since it is the frequency difference which results in the audio signal, the effect of the transition is to introduce a shift in phase at the audio signal, as at G of plot H. This action, however, does not introduce any appreciable distortion into the audio output, since the carrier $f_1$, in response to modulation signal A, seldom approaches or reaches the limits of the assigned channel, on a statistical basis. When reversals in phase do occur they are substantially inaudible, since they take place extremely rapidly, and are not of a recurrent nature.

Figure 2:
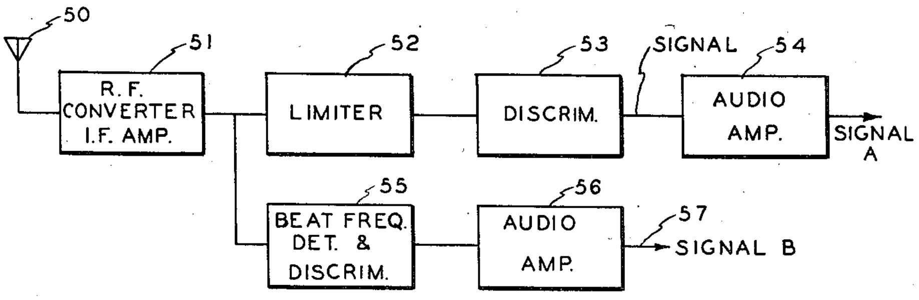
Figure 2 is a block diagram of a receiver arranged in accordance with the invention.

Referring now to Figure 2 of the accompanying drawing, there is illustrated in block diagram a receiver capable of receiving and separately detecting the modulation signals A and B from the carriers transmitted by the transmitter of Figure 1. Specifically, a receiving antenna 50 is provided which transfers the signals $f_1$ and $f_2$ to a conventional R. F. stage, converter, and I. F. amplifier 51. The output of the I. F. amplifier is applied to a limiter 52, in accordance with conventional practice in the art of reception of frequencies modulated signals, and the output of the limiter 52 is applied to a discriminator 53. The output of the latter is in turn applied to an audio amplifier 54 which supplies at its output the signal A. The signal A as supplied by the audio amplifier 54 contains no interference due to the presence of the carrier $f_1 \pm f_0$ with $f_0$ modulated in response to signal B, because carrier $f_1$ is the stronger of the two carriers, and as is well known, it is a property of frequency modulation receivers, which employ limiting, to exclude from the output of the receiver signals which are appreciably lower in amplitude when a stronger signal is present.

From the output of the R. F. stage, converter, and I. F. amplifier 51 is derived a second output consisting of an I. F. carrier modulated in response to signals A and A+B, or corresponding broadly with the carriers $f_1$ and $f_1 \pm f_0$. This output is applied to a beat frequency detector and discriminator 55, the character of which has been illustrated and described in an application for U. S. patent, Serial No. 133,871, filed in the name of Raymond F. Wilmotte on December 19, 1949, and entitled "F. M. Systems I." The output of the beat frequency detector and discriminator is proportional at each instant to the frequency difference between the carriers $f_1$ and $f_1 \pm f_0$, and accordingly is proportional to the frequency $f_0$, as the latter is modulated in frequency by the signal B. The output of the beat frequency detector and discriminator 55 corresponds accordingly with signal B and may be amplified in an audio amplifier 56 and applied to an output lead 57.

It has become common in the design of frequency modulation transmitters to apply automatic frequency control to the oscillators of the system, these controls tending to maintain the mean frequency of the oscillator at the predetermined value. It will be clear that a conventional automatic frequency control system may be applied to the oscillator 7, in the channel which transmits signal A alone, since the mean value of the carrier $f_1$ provided by this channel has a fixed value. On the other hand, the channel comprising frequency modulated oscillator 19 is in a different situation since the mean value of the carrier transmitted in this channel is $f_1 \pm f_0$ since the mean value of the carrier $f_1 \pm f_0$ transmitted in this channel alternates between two values of mean frequency. I have accordingly provided a novel system of automatic frequency control for the channel comprising frequency modulated oscillator 19, in which two differently tuned automatic frequency control circuits are employed, one or the other of which is operative, in alternation, in accordance with the mean value of the carrier $f_1 \pm f_0$, or in accordance with whether $f_0$ is positive or negative.

Figure 4:
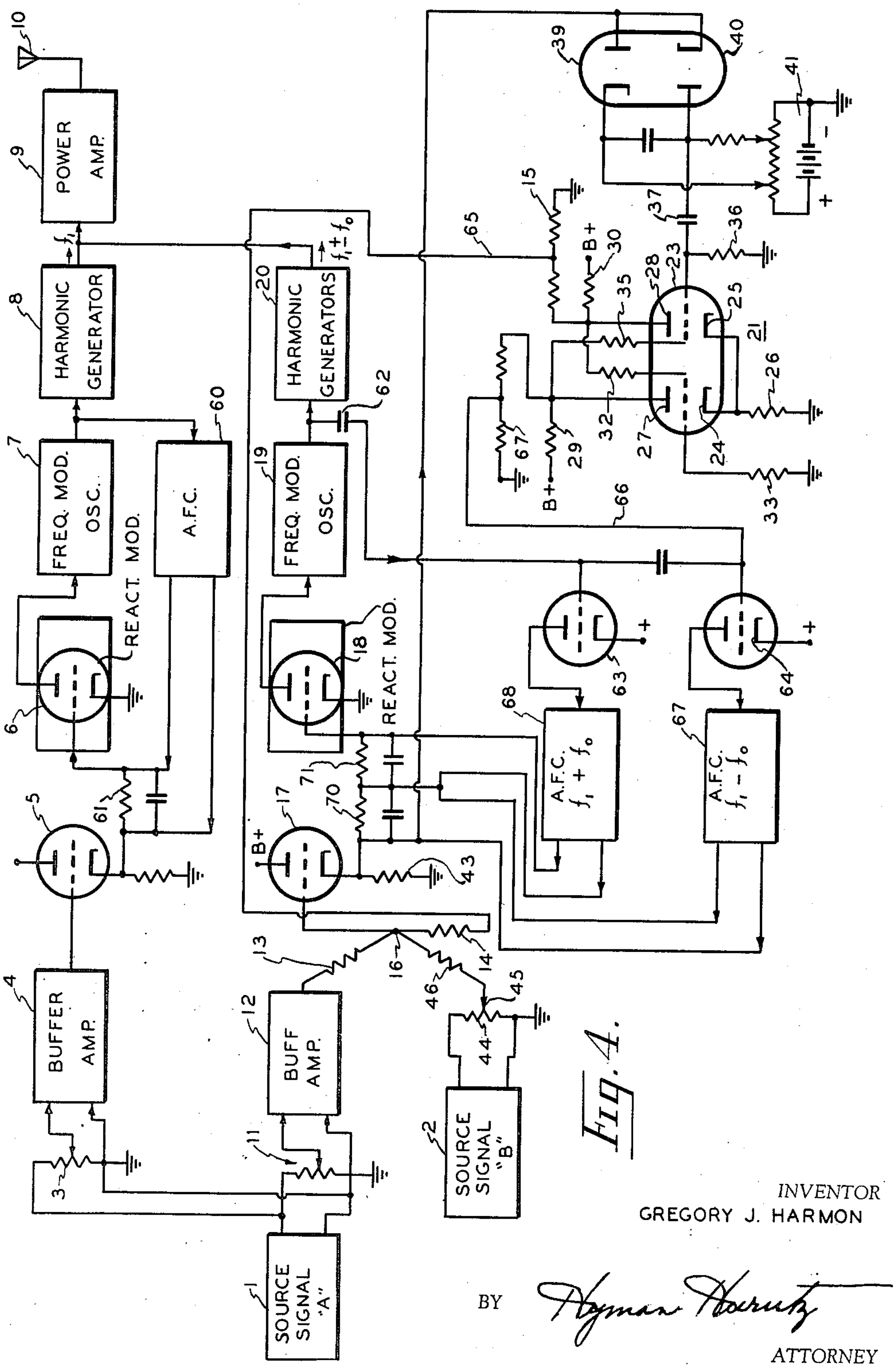

Reference is now made more specifically to Figure 4, which is a system following the general plan of that illustrated in Figure 1 of the drawings, but which adds to the system of Figure 1 various automatic frequency control circuits. Identical numerals of reference are applied to corresponding parts in Figures 1 and 4.

It will be noted that the output of the frequency modulated oscillator 7 is applied to an automatic frequency control circuit 60 and that the output of the latter is applied across a resistor 61 interposed between the cathode of the cathode follower 5 and the control electrode of the reactance modulator 6. Accordingly, the output A. F. C. voltage supplied by the A. F. C. circuit 60 serves in part to determine the frequency of the frequency modulated oscillator 7, in accordance with principles well understood in the art, and serves to maintain the mean value of the carrier $f_1$ at a frequency established by the automatic frequency control circuit 60.

In the channel which transmits carrier $f_1 \pm f_0$ the output of the frequency modulated oscillator 19 is applied via coupling condensers 62 to the control electrodes of two triodes 63 and 64 simultaneously, the two triodes having positively biased cathodes, and having their control electrodes connected via D. C. circuits 65 and 66 respectively to points of positive voltage on the multivibrator 21. More specifically, the lead 65 is connected to provide the voltage which appears across the resistance 15, and which has two alternative positive values depending upon whether the triode section 23 is conductive or non-conductive, and the lead 66 is connected to apply to the control electrode of the triode 64 a voltage developed across a resistor 67, associated with triode section 22 in the same way as is resistor 15 with triode section 23. Accordingly, the voltage on lead 65 has a relatively high positive value when triode section 23 is conductive and a lower positive value when triode section 23 is non-conductive, and the voltage on lead 66 has a relatively high positive voltage when triode section 22 is non-conductive and a relatively lower positive voltage when triode section 22 is conductive. Since triode sections 22 and 23 are conductive in alternation, the voltages available on leads 65 and 66 take on respectively higher and lower values in alternation, one being high while the other is low, and vice versa. The voltages are so selected in relation to the positive bias voltages applied to the cathodes of triodes 63 and 64, that the triode 63 is conductive when the voltage on lead 65 has its more positive voltage and non-conductive when the voltage on lead 65 has its less positive voltage value, while the triode 64 is conductive when the voltage on lead 66 has its more positive voltage and is non-conductive when the voltage on lead 66 has its less positive value.

Accordingly, triodes 63 and 64 constitute gating tubes which are "on" in alternation, in synchronism with the operation of the multi-vibrator 21. Since the control electrodes of the triodes 63 and 64 are coupled via condenser 62 to the output of frequency modulated oscillator 19, the output of oscillator 19 is applied via triodes 63 and 64 to A. F. C. circuits 68 and 69 in alternation. The A. F. C. circuit 68 may be tuned to maintain the output of oscillator 19 at the desired mean frequency of the carrier $f_1 + f_0$, while the A. F. C. circuit 69 may be designed to maintain the output of the FM oscillator 19 at the desired mean frequency of the carrier $f_1 - f_0$. Since the triode 63 and 64 are rendered operative in alternation, the A. F. C. circuits 68 and 69 are similarly rendered operative in alternation and accordingly the output frequency of the FM oscillator 19 is maintained by the A. F. C. circuits 68 and 69 at the desired mean values as the mean value of the carrier $f_0$ varies from positive to negative.

The outputs of the A. F. C. circuits 68 and 69 are applied respectively to resistors 70 and 71, which are connected in series between the cathode of the cathode follower circuit 17 and the control electrode of the reactance modulator 18, so that either A. F. C. voltage is applied to the control electrode of the reactance modulator 18 in series with the voltage developed across the cathode load 43 of the cathode follower 17.

While I have described and illustrated a specific embodiment of my invention it will be clear that variations in general arrangement and in details of circuit design may be resorted to without departing from the invention as defined in the appended claims.

What I claim and desire to secure by Letters Patent of the United States is:

1. In a frequency modulation system, means for generating a first wave at a median frequency $f_1$, means for generating a second wave at a median frequency $f_2$, the median frequency difference between $f_1$ and $f_2$ being in alternation $+f_0$ and $-f_0$, a source of first modulating signal, as source of second modulating signal, means for modulating said first wave in frequency in response to said first source of modulating signal in a frequency channel extending from $f_1+F$ to $f_1-F$, where $+F$ is the frequency of the upper limit of said channel, and $-F$ is the lower limit of said channel means for modulating said second wave in response to said first modulating signal in the same sense and to the same extent as said first wave, means for additionally modulating said second wave in frequency in response to said second modulating signal with deviations having maximum values $\pm f_0$, and means for additionally frequency modulating said second wave by fixed amounts $2f_0$ toward the interior of said frequency channel wherever said second wave approaches the frequencies $f_1-F$ and $f_2+F$.

2. In a frequency modulation system, means for generating a first wave at median frequency $f_1$, means for generating a second wave at median frequency $f_2$, the frequency difference between $f_1$ and $f_2$ being in alternation $+f_0$ and $-f_0$, a source of first modulating signal, a source of second modulating signal, means for modulating said first wave in frequency in response to said first source of modulating signal in a frequency channel extending from $f_1+F$ to $f_1-F$, where F is a fixed value of frequency, means for modulating said second wave in response to said first modulating signal in the same sense and to the same extent as said first wave, means for additionally modulating said second wave in frequency in response to said second modulating signal with deviations having maximum values $\pm f_0$, and means for selectively controlling whether said frequency difference $\pm f_0$ shall be $+f_0$ or $-f_0$, in response to predetermined magnitudes of the algebraic sum of said first and second modulating signals.

3. A frequency modulation transmitter comprising means for generating a first wave of median frequency $f_1$, means for generating a second wave of median frequency $f_2$, a source of first signal, a source of second signal, means for substantially identically deviating said waves $f_1$ and $f_2$ in frequency in response to said first signal while maintaining a fixed frequency difference $f_0$ therebetween, means for varying said frequency $f_0$ in response to said second signal, and means for reversing the algebraic sign of $f_0$ at predetermined values of frequency of said second wave in such sense as to reduce frequency deviations of said second wave.

4. The combination in accordance with claim 3 wherein is further provided a receiver for said waves, said receiver comprising means for detecting said first signal by frequency demodulation of said first wave, means for detecting the frequency $f_0$, and means for detecting said second signal by frequency demodulation of said frequency $f_0$.

5. In a frequency modulation system, means for generating a first carrier at frequency $f_1$ when unmodulated, a source of first A. C. signal having maximum magnitudes $\pm M$, means responsive to said first signal for modulating said first carrier in frequency with maximum deviations $\pm F$ attained in response to said maximum magnitudes $\pm M$, means for generating a second A. C. wave having a frequency $f_1 \pm f_0$ when unmodulated, a source of second A. C. signal having maximum magnitude $\pm M$, means for modulating said second wave in frequency in response to the algebraic sum of the magnitudes of said first and second signals, and means for continuously establishing an algebraic sign for $f_0$ such that $f_1 \pm f_0$ shall fall continuously within said maximum deviations $\pm F$.

6. In a frequency modulation system, means for generating a first carrier having a mean frequency $f_1$, means for generating a second carrier, a source of D. C. voltage variable from a first fixed value to a second fixed value, means responsive to said D. C. voltage for selectively establishing the mean frequency of said second carrier at $f_1+f_0$ and $f_1-f_0$ according as said D. C. voltage has said first and second fixed values, respectively, a source of first modulating signal, means for modulating said first and second carriers in frequency substantially identically in response to said first modulating signal, a source of second modulating signal, means for frequency modulating said frequency $f_0$ in response to said second modulating signal, means deriving a further signal proportional at each instant to the algebraic sum of the amplitudes of said first and second modulating signals, and means responsive to said further signal upon attainment of predetermined amplitude thereof for varying said D. C. voltage from one of said fixed values to the other of said fixed values.

7. In a frequency modulation system for transmitting within a preassigned channel, means for generating two identically modulated frequency modulated waves having a mean frequency separation $f_0$, a source of signal, means for further frequency modulating one of said frequency modulated waves, in response to said signal, whereby the frequency difference between said waves is representative of said signal, and means for still further frequency modulating said one of said frequency modulated waves by amounts selectively $\pm f_0$ to maintain said one of said frequency modulated waves within said pre-assigned channel, during said first mentioned modulations.

GREGORY J. HARMON.

REFERENCES CITED

The following references are of record in the file of this patent:

UNITED STATES PATENTS

| Number | Name | Date |
|---|---|---|
| 1,607,158 | Hammond | Nov. 16, 1926 |
| 1,740,859 | Hammond | Dec. 24, 1929 |
| 2,179,106 | Taylor et al. | Nov. 7, 1939 |
| 2,315,050 | Crosby | Mar. 30, 1943 |
| 2,394,393 | Mayer | Feb. 5, 1946 |